(12) United States Patent
Svendsen

(10) Patent No.: US 10,613,984 B2
(45) Date of Patent: *Apr. 7, 2020

(54) PREFETCH TAG FOR EVICTION PROMOTION

(71) Applicant: Ampere Computing LLC, Santa Clara, CA (US)

(72) Inventor: Kjeld Svendsen, Sunnyvale, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,130

(22) Filed: Apr. 19, 2018

(65) Prior Publication Data

US 2018/0239706 A1    Aug. 23, 2018

Related U.S. Application Data

(63) Continuation of application No. 14/710,837, filed on May 31, 2015, now Pat. No. 9,971,693.

(51) Int. Cl.
*G06F 12/02* (2006.01)
*G06F 12/0862* (2016.01)
*G06F 12/126* (2016.01)

(52) U.S. Cl.
CPC ........ *G06F 12/0862* (2013.01); *G06F 12/126* (2013.01)

(58) Field of Classification Search
None
See application file for complete search history.

(56) References Cited

U.S. PATENT DOCUMENTS

| 4,731,739 | A  | 3/1988  | Woffinden et al.  |
| 6,292,871 | B1 | 9/2001  | Fuente            |
| 6,925,534 | B2 | 8/2005  | David             |
| 6,990,557 | B2 | 1/2006  | Hokenek et al.    |
| 7,130,965 | B2 | 10/2006 | Hammarlund et al. |
| 7,493,452 | B2 | 2/2009  | Eichenberger et al. |
| 7,555,633 | B1 | 6/2009  | Smaus et al.      |
| 7,840,761 | B2 | 11/2010 | Colavin et al.    |

(Continued)

FOREIGN PATENT DOCUMENTS

| EP | 1612683 A2 | 1/2006  |
| JP | 10-320285  | 12/1998 |

(Continued)

OTHER PUBLICATIONS

International Search Report & Written Opinion for PCT Application Serial No. PCT/US2015/042792, dated Feb. 12, 2016, 12 pages.

(Continued)

*Primary Examiner* — Charles Rones
*Assistant Examiner* — Ryan Dare
(74) *Attorney, Agent, or Firm* — Alston & Bird LLP

(57) ABSTRACT

Various embodiments provide for a system that prefetches data from a main memory to a cache and then evicts unused data to a lower level cache. The prefetching system will prefetch data from a main memory to a cache, and data that is not immediately useable or is part of a data set which is too large to fit in the cache can be tagged for eviction to a lower level cache, which keeps the data available with a shorter latency than if the data had to be loaded from main memory again. This lowers the cost of prefetching useable data too far ahead and prevents cache trashing.

20 Claims, 8 Drawing Sheets

(56) References Cited

U.S. PATENT DOCUMENTS

| | | | |
|---|---|---|---|
| 2007/0186048 | A1 | 8/2007 | Nakanishi et al. |
| 2009/0132768 | A1* | 5/2009 | Jones .................. G06F 12/0862 |
| | | | 711/144 |
| 2009/0307433 | A1 | 12/2009 | Jones et al. |
| 2010/0235579 | A1 | 9/2010 | Biles et al. |
| 2010/0274971 | A1 | 10/2010 | Solihin |
| 2011/0072218 | A1 | 3/2011 | Manne et al. |
| 2011/0113199 | A1 | 5/2011 | Tang et al. |
| 2012/0079205 | A1 | 3/2012 | Conway |
| 2014/0164712 | A1 | 6/2014 | Takamura |
| 2014/0173203 | A1 | 6/2014 | Forsyth |
| 2014/0181402 | A1 | 6/2014 | White |
| 2016/0077970 | A1 | 3/2016 | Liu et al. |
| 2016/0217080 | A1 | 7/2016 | Solihin |

FOREIGN PATENT DOCUMENTS

| | | |
|---|---|---|
| JP | 2013-542511 | 11/2013 |
| JP | 2014-115851 | 6/2014 |
| WO | WO 2005/091146 | 9/2005 |

OTHER PUBLICATIONS

United States Patent and Trademark Office, Office Action for U.S. Appl. No. 14/710,837, dated Aug. 12, 2016, 8 pages, U.S.A.

United States Patent and Trademark Office, Office Action for U.S. Appl. No. 14/710,837, dated Jan. 31, 2017, 11 pages, U.S.A.

United States Patent and Trademark Office, Office Action for U.S. Appl. No. 14/710,837, dated Jun. 30, 2017, 13 pages, U.S.A.

United States Patent and Trademark Office, Notice of Allowance for U.S. Appl. No. 14/710,837, dated Jan. 12, 2018, 7 pages, U.S.A.

Office action and search report for corresponding Chinese Application No. 201580080376.0 dated Feb. 11, 2019 with English Translation, 18 pages.

Extended European Search Report for corresponding European Application No. 15892043.9 dated Dec. 12, 2018, 9 pages.

Notice of Allowance for corresponding Japanese Application No. 2018-511588 dated Feb. 8, 2019, 5 pages.

* cited by examiner

PREFETCH TAG FOR EVICTION PROMOTION

This application is a continuation of U.S. Appl. Ser. No. 14/710,837 filed May 13, 2015, the contents of which are hereby incorporated in their entirety by reference.

TECHNICAL FIELD

The subject disclosure relates generally to a system for prefetching data to a cache from a main memory and evicting data to prevent cache trashing.

BACKGROUND

Modern microprocessors are much faster than the memory where the program is stored in, which means that the program instructions cannot be read fast enough to keep the microprocessor busy if the instructions are read from the main memory. Adding a cache, which is a small amount of very fast memory to each processor, can speed up processing time by providing faster access to needed instructions.

Prefetching is the process where anticipated instructions are loaded into the cache before being requested by the processor. Modern systems have evolved into multi-cache systems where each processor, or each core of the processor may have one or two levels of cache dedicated to each core/processor, and one or more additional cache levels that are shared among cores/processors. Each successive level of cache away from the core/processor may be larger but slower than the preceding cache levels. Prefetching from the main memory to a processor cache, such as level 1 or level 2 cache, can provide low latency access to the data, but since the size of the processor caches are small, data that is not used right away, or datasets which are larger than the size of the cache, can cause resource conflicts and upsets (cache trashing).

The above-described description is merely intended to provide a contextual overview of current techniques for performing and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a cache prefetch system comprises an interconnect configured for communicably coupling a processor, a shared cache, and a main memory. The cache prefetch system also can include a processor cache prefetcher configured for prefetching a set of data from the main memory via the interconnect to a processor cache, wherein the processor cache is associated with the processor, and wherein the processor cache tags a first portion of data from the set of data as unused and a second portion of data from the set of data as used. The cache prefetch system can also include a processor cache evictor configured for evicting the first portion of data to the shared cache via the interconnect and evicting the second portion of data to the main memory via the interconnect.

In another example embodiment, a cache prefetch system can include a processor; and a memory that stores executable instructions that, when executed by the processor, facilitate performance of operations. The operations can include prefetching a set of data from a system memory to a processor cache, associated with the processor and tagging a first portion of data of the set of data with an indication that the first portion of data is executed data. The operations can also include tagging a second portion of data of the set of data with an indication that the second portion of data is likely to be executed data and evicting the second portion of data to a shared cache.

In yet another example embodiment, a method comprises prefetching a set of data from a system memory to a processor cache, associated with the processor. The method can also include tagging a first portion of data of the set of data with an indication that the first portion of data is used data. The method can also include tagging a second portion of data of the set of data with an indication that the second portion of data is unused data. The method can also include evicting the second portion of data to a shared cache.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
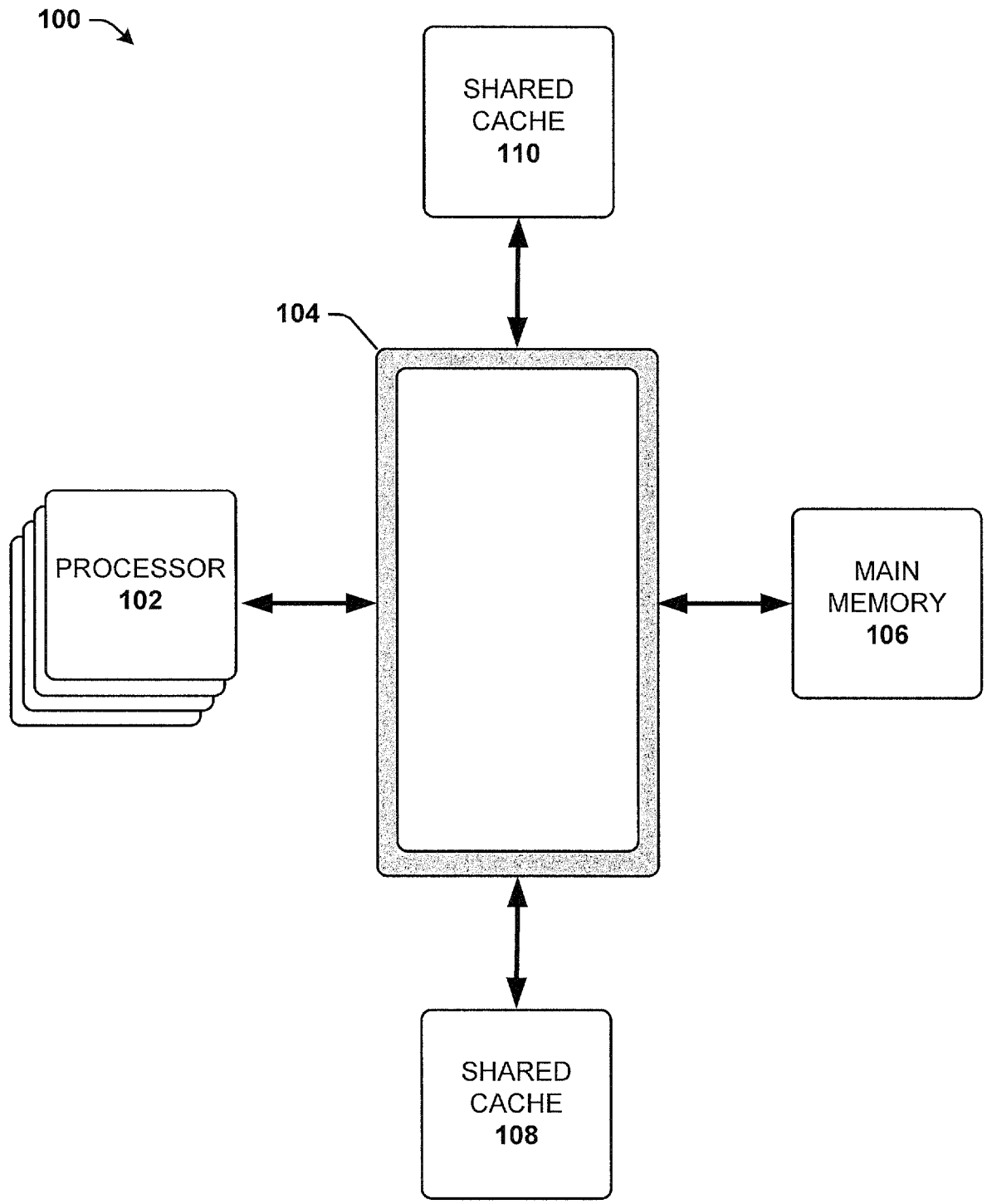
FIG. 1 is a block diagram illustrating an example, non-limiting embodiment of a system for prefetching with a ring architecture interconnect in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various embodiments provide for a system that prefetches data from a main memory to a cache and then evicts unused data to a lower level cache. The prefetching system will prefetch data from a main memory to a cache, and data that is not immediately useable or is part of a data set which is too large to fit in the cache can be tagged for eviction to a lower level cache, which keeps the data available with a shorter latency than if the data had to be loaded from main memory again. This lowers the cost of prefetching useable data too far ahead and prevents cache trashing.

Data can be prefetched well before it may be used, as loads from slower memories (DDR, disks) tend to be spatial and temporal in nature. Prefetching takes advantage of the spatial nature of loads since related data may be located physically or logically near the data that is being requested by the processor. Thus, for address streams, there is a high likelihood that a load to a memory address A will be followed soon by a load to memory address A+N, where N can be any arbitrary integer, and thus loads likely occur in strides to addresses A+N*m where m is another arbitrary signed integer.

By prefetching related data as well as currently requested data, future loading of data from the main memory or from storage can be avoided. Since processor level caches, such as level 2 caches are not very large, data should not be stored there unless it is next in line for execution or will be processed very soon. Therefore, data that is not immediately next in line can be tagged as unused data, and can be evicted to a lower level cache, such as level 3 cache. Level 3 cache may be slower than level 2 cache, but it can be much larger, and can more feasibly retain data that may be used at a later time. When the data that was evicted to the level 3 cache is then required by the processor, the level 2 cache can prefetch that data from the level 3 cache must faster than prefetching the data from the main memory.

Turning now to FIG. 1, a block diagram illustrating an example, non-limiting embodiment of a system 100 for prefetching with a ring architecture interconnect in accordance with various aspects described herein is shown.

Processor 102 can include one or more cores (shown in FIG. 1 with 4 cores). Processor 102 can also include a processor level cache, or a cache associated with each core of processor 102. This cache can be a level 2 cache in some embodiments. The processor 102 can also be communicably coupled to one or more shared caches 108 and 110, and a main memory 106 via a ring interconnect 104. In systems with ring interconnects such as ring interconnect 104, the shared caches 108 and 110 can be shared among one or more processors (e.g., processor 102, etc) without being directly tied to each processor. The shared caches, level 3 caches in some embodiments, can thus be distributed among multiple cores and/or processors.

In an embodiment, processor 102 can include a processor level cache, or level 2 cache, for each core, or pair of cores in processor 102. Data that is executed by the processor 102 can be fetched from the level 2 cache to a level 1 cache, or even directly to a register associated with the processor 102. In order to ensure that the processor level cache on processor 102 has the data that the processor 102 will need for execution, and to avoid a cache miss, where the processor does not find the memory location in the cache, the processor cache can prefetch data from the main memory 106 via the ring interconnect 104. Using predictive heuristics, the prefetcher in the processor cache can predict which data is likely to be used next using the A+N*m algorithm described above, and preload the data into the processor cache so that the data is available when the processor 102 requires the data.

Since related data may be likely to be either physically or logically close to the requested data, or related in address space, the related data can be prefetched in addition to the requested data, since the related data may be requested by the processor at a later time. If the dataset is too large for the level 2 cache on the processor, or may not be used within a predetermined time period, the level 2 cache can mark that data as "prefetch only" or as "unused" which will promote the data for eviction to the shared cache 108 or 110. Data that may be completely unrelated can be evicted back the main memory 106, but if the data may possibly be used in the near future, or within a predetermined time period, the data can be tagged for eviction to the shared cache 108 or 110. The data can be tagged by setting an indicator bit on or off based on whether the data is to be evicted to the shared cache 108 or 110. In an embodiment, the data can be tagged based on an indication of a probability of future use by the processor. Based on the probability of future use, the level 3 cache, or the shared cache 108 or 110 can hold the data for a predetermined length of time before evicting to the main memory 106. Similarly, if the probability of future use within a predetermined period of time is very high, the processor cache may not tag the data for eviction.

When that data is requested by the processor at the later time, the latency to retrieve the data from the shared cache 108 or 110 will be much shorter than the latency retrieving the data from main memory 106.

It is to be appreciated that although reference has been made to level 2 and level 3 cache, the concepts herein that describe a prefetch system that tags prefetched data for eviction to a hierarchically lower cache system can be applied in other embodiments. For instance, data can be prefetched to a level 1 cache, and then evicted to a level 2 cache, and in other embodiments, level 3 and 4 caches can be used, or various combinations thereof.

Figure 2:
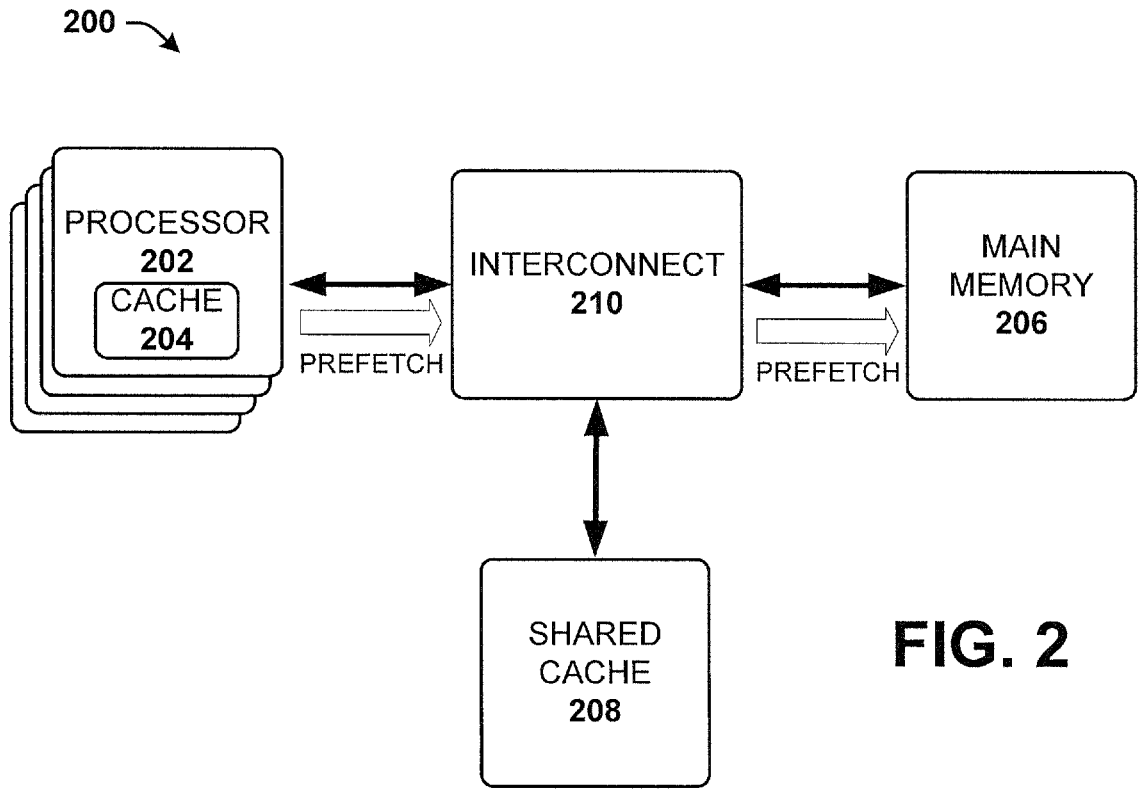
FIG. 2 is a block diagram illustrating an example, non-limiting embodiment of a prefetching system in accordance with various aspects described herein.

Turning now to FIG. 2, illustrated is a block diagram illustrating an example, non-limiting embodiment of a prefetching system 200 in accordance with various aspects described herein.

Processor 202 can include one or more cores (shown in FIG. 2 with 4 cores). Processor 202 can also include a processor level cache 204 and in some embodiments, each core can include a cache like cache 204. The cache 204 can be a level 2 cache in some embodiments. The processor 202 can also be communicably coupled to an interconnect 210 and via the interconnect 210 to a shared cache 208 and a main memory 206. In an embodiment, the shared cache 208 can be shared among one or more processors (e.g., processor 202, etc) and/or cores without being directly tied to each processor. The shared cache 208, level 3 cache in some embodiments, can thus be distributed among multiple cores and/or processors.

Data that is executed by the processor 202 can be fetched from the level 2 cache to a level 1 cache, or even directly to a register associated with the processor 202. In order to ensure that the processor level cache 204 on processor 202 has the data that the processor 202 will need for execution, and to avoid a cache miss, where the processor does not find the memory location in the cache, the processor cache can prefetch data from the main memory 206 via the interconnect 210. Using predictive heuristics, the prefetcher in the processor cache can predict which data is likely to be used next using the A+N*m algorithm described above, and send a request to main memory 206 via interconnect 210 to preload the data into the processor cache 204 so that the data is available when the processor 202 requires the data.

Figure 3:
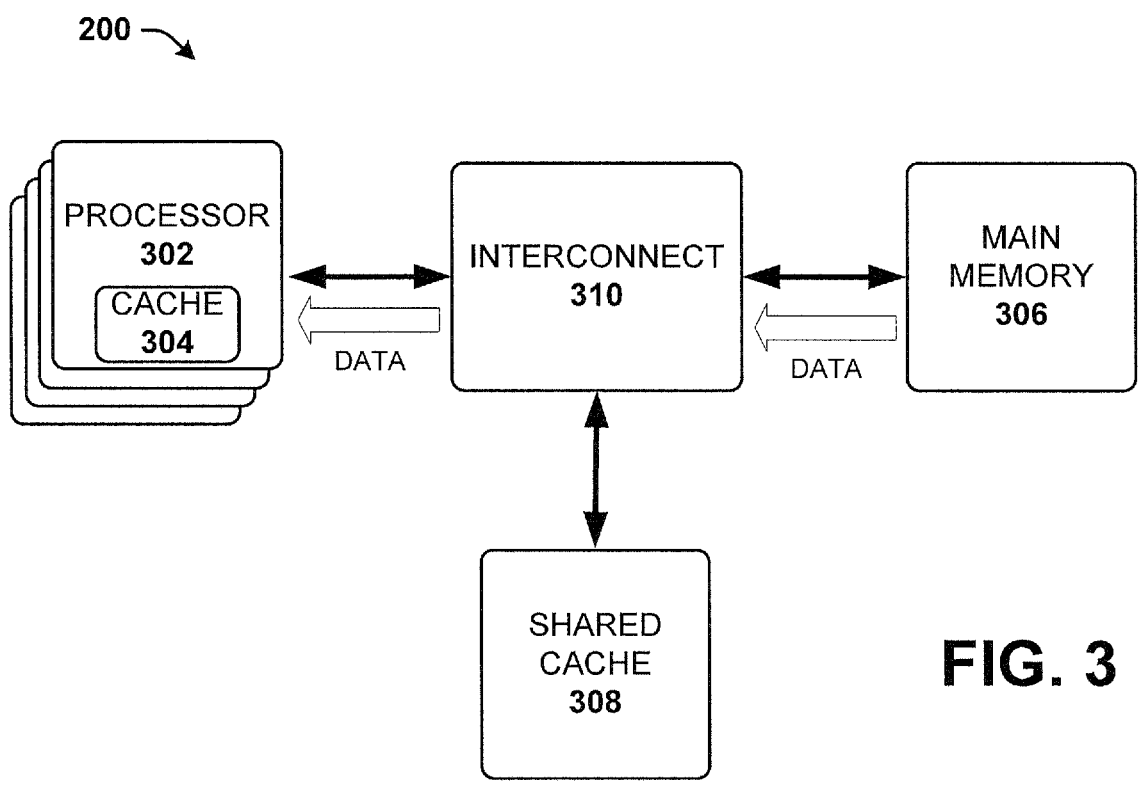
FIG. 3 is a block diagram illustrating an example, non-limiting embodiment of a prefetching system in accordance with various aspects described herein.

Turning now to FIG. 3, illustrated is a block diagram of an example, non-limiting embodiment of a prefetching system 300 in accordance with various aspects described herein. After the processor 302 and prefetcher in the cache 304 requests data to be preloaded from main memory 306, the data can be sent from the main memory 306 to the processor 302 and cache 304 via the interconnect 310. In some embodiments, the data can be directly prefetched to the level 2 cache 304, skipping the shared cache 308 (level 3 cache), and in other embodiments, the data can first be prefetched to shared cache 308 and then prefetched from shared cache 308 to cache 304. The data that is prefetched by the cache 304 can be data that is being requested by the processor 302 as well as other data that may be related to the data being requested. The related data can be data that is related in address space, or located physically or logically near the requested data, and by prefetching all the possibly related data can be more efficient than prefetching, in multiple operations, the requested data.

Figure 4:
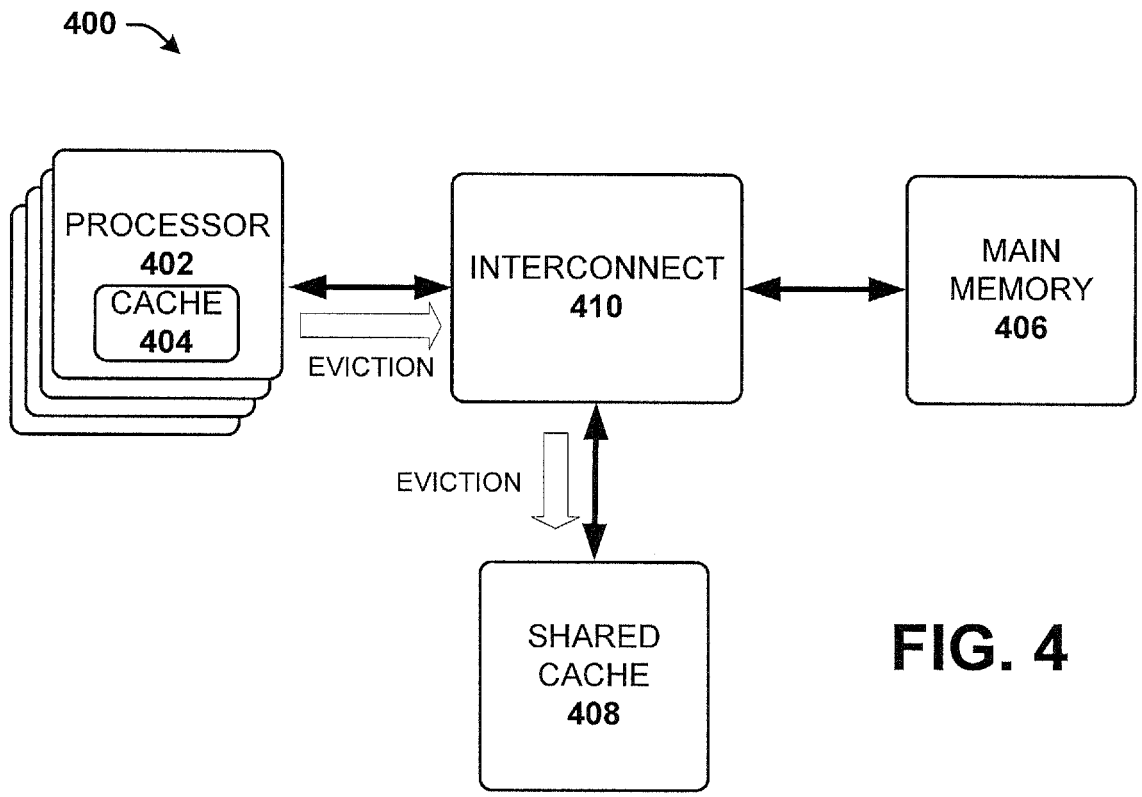
FIG. 4 is a block diagram illustrating an example, non-limiting embodiment of a prefetching system in accordance with various aspects described herein.

Turning now to FIG. 4, illustrated is another block diagram of an example, non-limiting embodiment of a prefetching system 400 in accordance with various aspects described herein.

After the processor 402 and cache 404 have prefetched a set of related data from a main memory 406, the cache 404 can evict a portion of the data to a shared cache 408 via an interconnect 410. Since related data may be likely to be either physically or logically close to the requested data, or related in address space, the related data can be prefetched in addition to the requested data since the related data may be requested by the processor at a later time. If the dataset is too large for the cache 404 on the processor 402, or may not be used within a predetermined time period, the cache 404 can mark that data as "prefetch only" or as "unused" which will promote the data for eviction to the shared cache 408. Data that may be completely unrelated can be evicted back the main memory 406, but if the data may possibly be used in the near future, or within a predetermined time period, the data can be tagged for eviction to the shared cache 408. The data can be tagged by setting an indicator bit on or off based on whether the data is to be evicted to the shared cache 408. In an embodiment, the data can be tagged based on an indication of a probability of future use by the processor 402. Based on the probability of future use, the level 3 cache, or the shared cache 408 can hold the data for a predetermined length of time before evicting to the main memory 406. Similarly, if the probability of future use within a predetermined period of time is very high or above a predetermined probability, the processor cache 404 may not tag the data for eviction.

Figure 5:
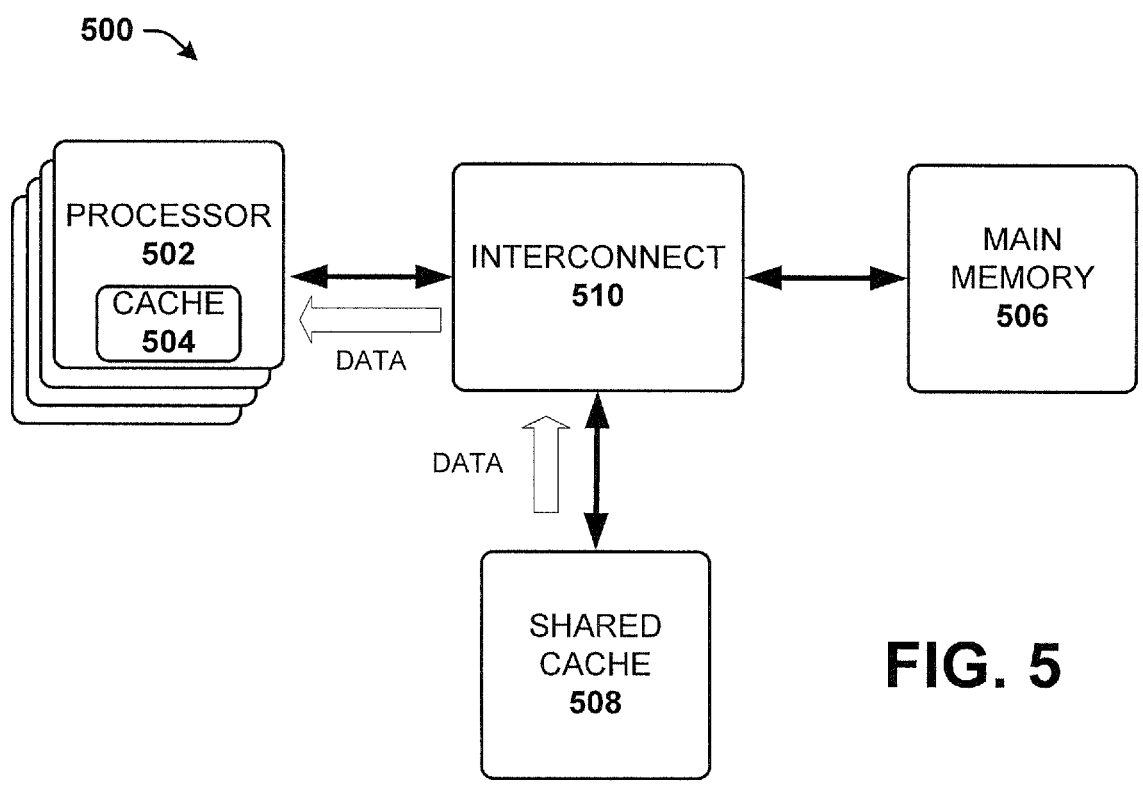
FIG. 5 is a block diagram illustrating an example, non-limiting embodiment of a prefetching system in accordance with various aspects described herein.

Turning now to FIG. 5, illustrated is a block diagram of an example, non-limiting embodiment of a prefetching system 500 in accordance with various aspects described herein. After the tagged data has been evicted to the shared cache 508, if the processor 502 requests the evicted data, or a prefetcher on cache 504 determines that the processor 502 will soon process/execute the related data, the data can be retrieved from the shared cache 508 via the interconnect 510. In an embodiment, if the data has already been evicted back to the main memory 506, the cache 504 can load the data from the main memory 506 via the interconnect 510.

Figure 6:
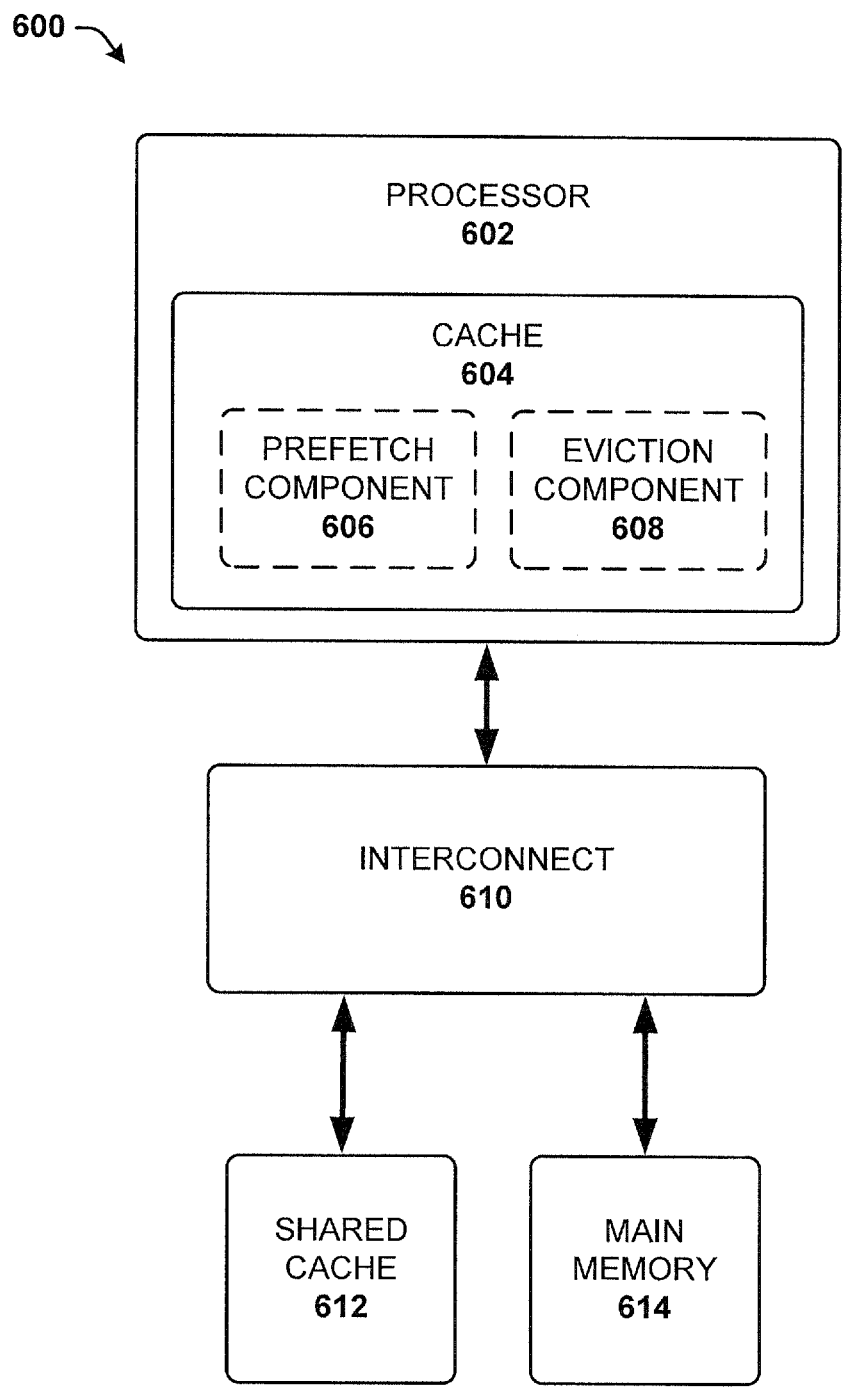
FIG. 6 is a block diagram illustrating an example, non-limiting embodiment of a processor with a prefetching cache system that evicts data to prevent cache trashing in accordance with various aspects described herein.

Turning now to FIG. 6, illustrated is a block diagram illustrating an example, non-limiting embodiment of a processor with a prefetching cache system 600 that evicts data to prevent cache trashing in accordance with various aspects described herein Processor 602 can include one or more cores and a cache 604. In some embodiments, each core, or pair of cores may have a corresponding cache. In some embodiments, cache 604 can be a level 2 cache. The processor 602 can also be communicably coupled to a shared cache 612, and a main memory 614 (DDR, disk, etc) via an interconnect 610. In systems with ring interconnects such as interconnect 610, the shared cache 612 can be shared among one or more processors (e.g., processor 602, etc) without being directly tied to each processor. The shared cache 612, level 3 caches in some embodiments, can thus be distributed among multiple cores and/or processors.

In an embodiment, the cache 604 can include a prefetch component 606 (prefetcher) and an eviction component 608 (evictor). The prefetch component can be configured to prefetch a set of data from the main memory 614 via the interconnect 610 to the cache 604, wherein the processor cache 604 is associated with the processor 602. The prefetch component 606 can tags a first portion of data from the set of data as unused and a second portion of data from the set of data as used.

The eviction component 608 can be configured to evict the first portion of data to the shared cache 612 via the interconnect 610 and evict the second portion of data to the main memory 614 via the interconnect 610.

Figure 7:
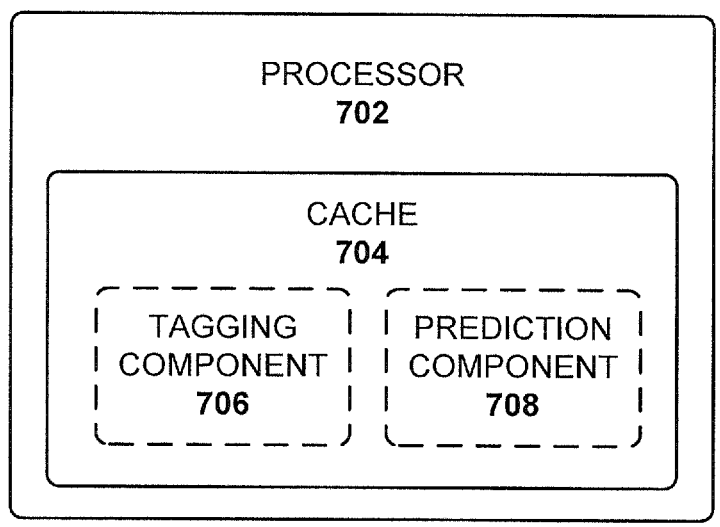
FIG. 7 is a block diagram illustrating an example, non-limiting embodiment of a processor with a prefetching cache system that evicts data to prevent cache trashing in accordance with various aspects described herein.

Turning now to FIG. 7, illustrated is a block diagram of an example, non-limiting embodiment of a processor with a prefetching cache system 700 that evicts data to prevent cache trashing in accordance with various aspects described herein.

The processor 702 can include a cache 704 that has a tagging component 706 and a prediction component 708. The tagging component 706 can tag data that is prefetched by the cache 704 to indicate that the data is unused, or is likely to be used in the future.

Since data related to the processor requested data may be likely to be either physically or logically close to the requested data, or related in address space, the related data can be prefetched in addition to the requested data, since the related data may be requested by the processor 702 at a later time. If the dataset is too large for the cache 704 on the processor, or may not be used within a predetermined time period, the cache 704 can tag that data as "prefetch only" or as "unused" which will promote the data for eviction to a level 3 cache or a lower level cache. Data that may be completely unrelated can be evicted back a main memory, but if the data may possibly be used in the near future, or within a predetermined time period, the data can be tagged for eviction to the shared cache. The data can be tagged by the tagging component 706 by setting an indicator bit on or off based on whether the data is to be evicted to the shared cache. In an embodiment, the data can be tagged based on an indication of a probability of future use by the processor. The prediction component 708 can determine a likelihood that the data is to be used by the processor 702 within a predetermined time period, and based on the probability of future use, the level 3 cache, or the shared cache can hold the data for a predetermined length of time before evicting to the main memory. The tagging component 706 can also set an indicator on the data indicating the relative or absolute probability of future use.

Figure 8:
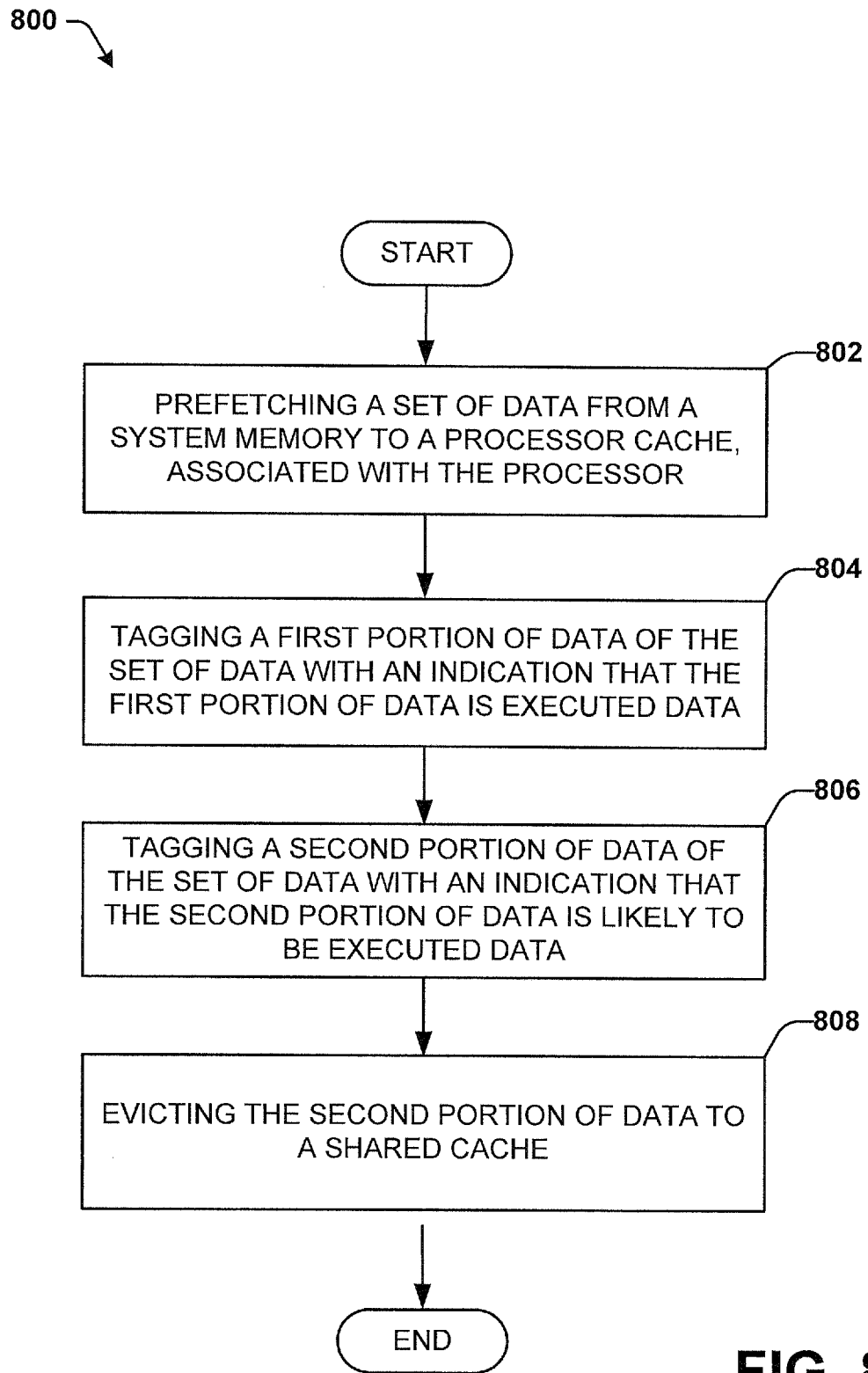
FIG. 8 illustrates a flow diagram of an example, non-limiting embodiment of a method for prefetching and evicting unused data to prevent cache trashing.

In view of the example systems described above, methods that may be implemented in accordance with the described subject matter may be better appreciated with reference to the flow chart of FIG. 8. While for purposes of simplicity, the method is shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring now to FIG. 8, a flow diagram of an example, non-limiting embodiment of a method for prefetching and evicting unused data to prevent cache trashing is shown. Methodology 700 can start at 702, where the method include prefetching a set of data from a system memory to a processor cache, associated with the processor. The prefetching can be performed by the prefetcher in the processor cache which can be a level 2 cache in some embodiments. The prefetching loads not just the data at a memory address indicated by the processor, but also data at memory addresses related to the requested data. Using predictive heuristics, the prefetcher can predict which data is likely to be used in the future, which can include data in a similar address space, or data physically or logically near to the requested data. This related data can be preloaded into the cache to allow faster access by the processor to the data.

At 704, the method can include tagging a first portion of data of the set of data with an indication that the first portion of data is used data. If data is used by the processor and if it is not likely to be used again in the near future, the data can be tagged for eviction back to the main memory or to disk. Similarly, at 706, the method can include tagging a second portion of data of the set of data with an indication that the second portion of data is likely to be executed data and at 708 where the method includes evicting the second portion of data to a shared cache. Data that may not be used right away, but may be used in the near future can be sent to a shared cache, (e.g., level 3 cache). This shared cache provides quicker access to the data than from main memory, and evicting it, allows the cache at the processor (level 2 cache) to retain data that might be used more immediately or sooner than the evicted data.

Example Computing Environment

Figure 9:
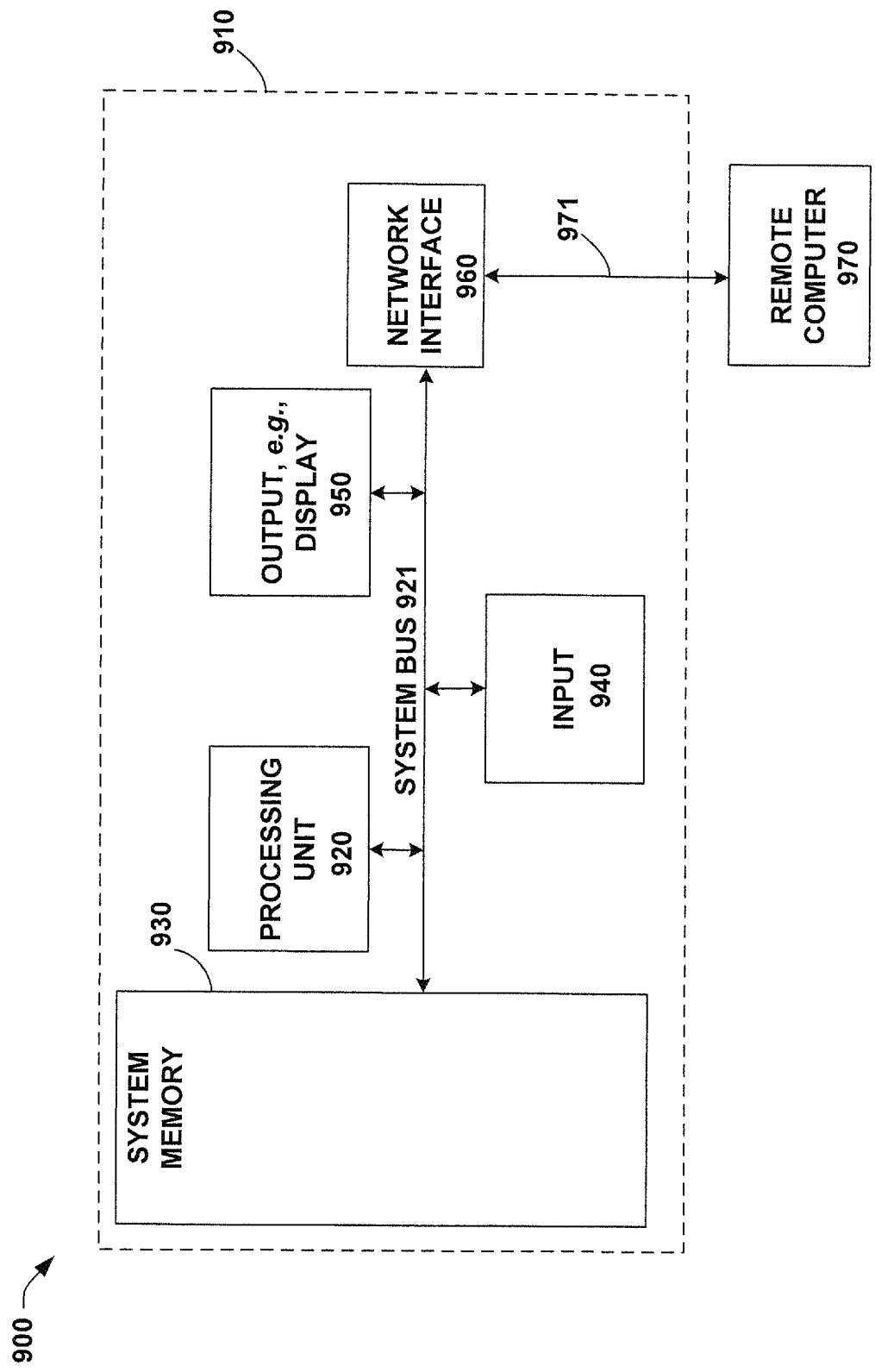
FIG. 9 illustrates a block diagram of an example electronic computing environment that can be implemented in conjunction with one or more aspects described herein.

As mentioned, advantageously, the techniques described herein can be applied to any device where it is desirable to facilitate the execution of prefetching and evicting to avoid cache trashing. It is to be understood, therefore, that handheld, portable and other computing devices and computing objects of all kinds are contemplated for use in connection with the various non-limiting embodiments, i.e., anywhere that a device may wish to share computing resources with a plurality of guest devices or virtual machines. Accordingly, the below general purpose remote computer described below in FIG. 9 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 9 thus illustrates an example of a suitable computing system environment 900 in which some aspects of the disclosed subject matter can be implemented, although as made clear above, the computing system environment 900 is only one example of a suitable computing environment for a device and is not intended to suggest any limitation as to the scope of use or functionality of the disclosed subject matter. Neither should the computing environment 900 be interpreted as having any dependency or requirement relating to any one or combination of components illustrated in the exemplary operating environment 900.

With reference to FIG. 9, an exemplary device for implementing the disclosed subject matter includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures.

Computer 910 typically includes a variety of computer readable media. Computer readable media can be any available media that can be accessed by computer 910. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules, or other data in a modulated data signal such as a carrier wave or other transport mechanism and includes any information delivery media.

The system memory 930 may include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, may be stored in memory 930. Memory 930 typically also contains data and/or program modules that are immediately accessible to and/or presently being operated on by processing unit 920. By way of example, and not limitation, memory 930 may also include an operating system, application programs, other program modules, and program data.

The computer 910 may also include other removable/non-removable, volatile/nonvolatile computer storage media. For example, computer 910 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 921 through a non-removable memory interface such as an interface, and a magnetic disk drive or optical disk drive is typically connected to the system bus 921 by a removable memory interface, such as an interface.

A user can enter commands and information into the computer 910 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 920 through user input 940 and associated interface(s) that are coupled to the system bus 921, but may be connected by other interface and bus structures, such as a parallel port, game port, or a universal serial bus (USB). A graphics subsystem can also be connected to the system bus 921. A projection unit in a projection display device, or a HUD in a viewing device or other type of display device can also be connected to the system bus 921 via an interface, such as output interface 950, which may in turn communicate with video memory. In addition to a monitor, computers can also include other peripheral output devices such as speakers which can be connected through output interface 950.

The computer 910 can operate in a networked or distributed environment using logical connections to one or more other remote computer(s), such as remote computer 970, which can in turn have media capabilities different from device 910. The remote computer 970 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 910. The logical connections depicted in FIG. 9 include a network 971, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 910 can be connected to the LAN 971 through a network interface or adapter. When used in a WAN networking environment, the computer 910 can typically include a communications component, such as a modem, or other means for establishing communications over the WAN, such as the Internet. A communications component, such as wireless communications component, a modem and so on, which can be internal or external, can be connected to the system bus 921 via the user input interface of input 940, or other appropriate mechanism. In a networked environment, program modules depicted relative to the computer 910, or portions thereof, can be stored in a remote memory storage device. It will be appreciated that the network connections shown and described are exemplary and other means of establishing a communications link between the computers can be used.

Example Networking Environment

Figure 10:
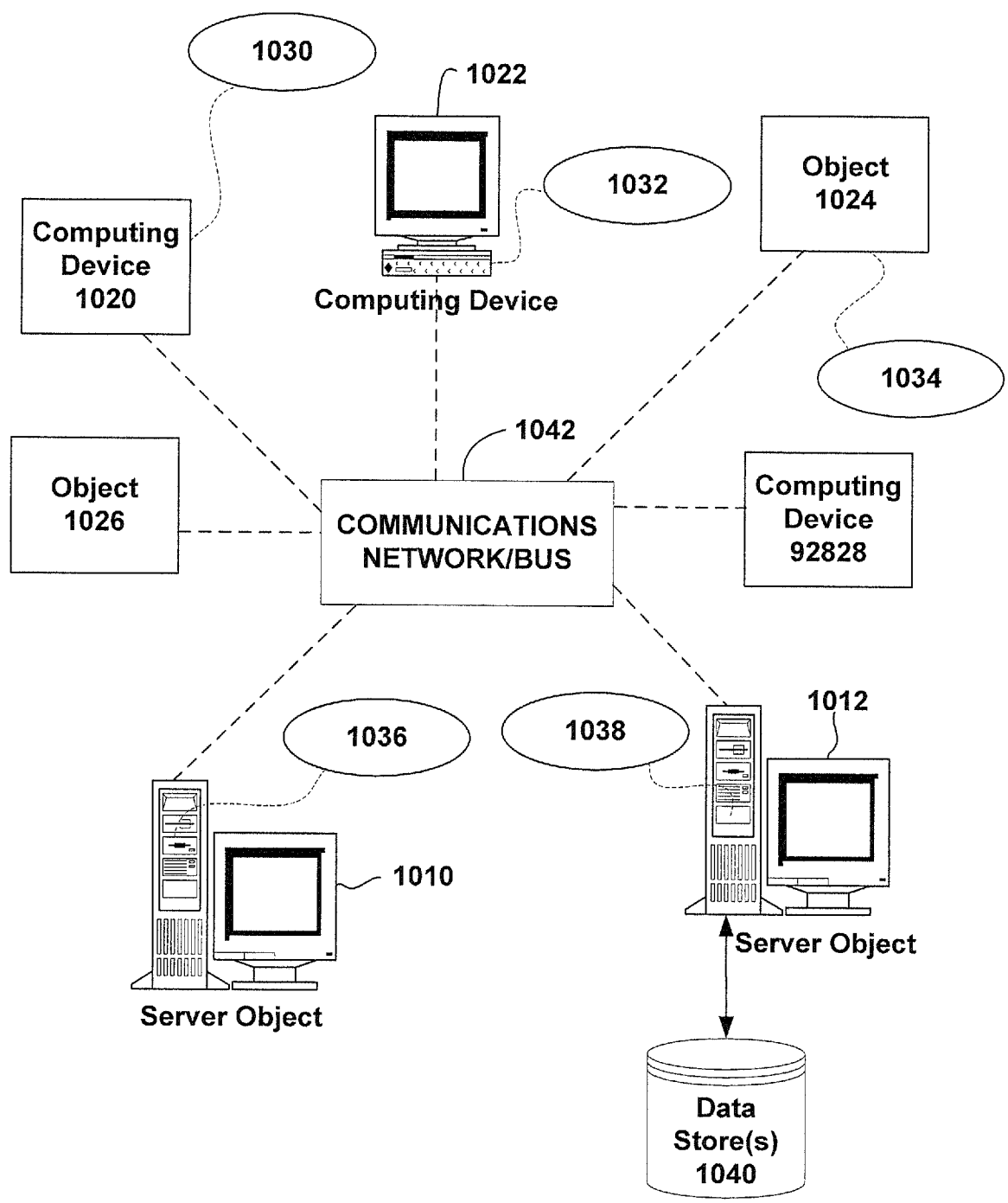
FIG. 10 illustrates a block diagram of an example data communication network that can be operable in conjunction with various aspects described herein.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, including microprocessor 512, or similar devices depicted within the illustrations, or other devices such as a mobile phone, personal digital assistant (PDA), audio/video device, MP3 players, personal computer, laptop, etc. It should be further appreciated that data store(s) 1040 can include data store 108, or other similar data stores disclosed herein.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, NAND and NOR memory refer to two types of flash memory based on the NAND and NOR logic gates that they respectively use. The NAND type is primarily used in main memory memory cards, USB flash drives, solid-state drives, and similar products, for general storage and transfer of data. The NOR type, which allows true random access and therefore direct code execution, is used as a replacement for the older EPROM and as an alternative to certain kinds of ROM applications. However, NOR flash memory can emulate ROM primarily at the machine code level; many digital designs need ROM (or PLA) structures for other uses, often at significantly higher speeds than (economical) flash memory may achieve. NAND or NOR flash memory is also often used to store configuration data in numerous digital products, a task previously made possible by EEPROMs or battery-powered static RAM.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A cache prefetch system, comprising:
   an interconnect configured for communicably coupling a processor, a lower-level cache having a lower-level cache's storage capacity, a higher-level cache having a higher-level cache's storage capacity, and a main memory, wherein the lower-level cache's storage capacity is smaller than the higher-level cache's storage capacity;
   a prefetcher component configured for prefetching a set of data from the main memory via the interconnect for storage in the lower-level cache, wherein the prefetcher tags a first portion of data of the set of data as optionally one of: (a) a part of a data set that exceeds the lower-level cache's storage capacity, or (b) unused data, wherein the first portion of data is determined to have a first probability of a first future use by the processor, wherein the first portion of data is to be sent to the higher-level cache, and
   wherein the prefetcher component tags a second portion of data associated with the set of data as used data to indicate that the second portion of data has been used by the processor and is to be sent from the processor cache to the main memory; and
   an evictor component configured for evicting the first portion of data from the lower-level cache to the higher-level cache via the interconnect, and evicting the second portion of data from the lower-level cache to the main memory.

2. The cache prefetch system of claim 1, wherein the interconnect comprises a ring interconnect.

3. The cache prefetch system of claim 1, wherein the lower-level cache comprises a level 2 cache, and the higher-level cache comprises a level 3 cache.

4. The cache prefetch system of claim 1, wherein the set of data comprises first data that is executed by the processor, and second data that is associated with the first data.

5. The cache prefetch system of claim 4, wherein the second data is determined to be related to the first data based on a determination that a first address space associated with the first data is within a defined proximity to a second address space associated with the second data in the main memory.

6. The cache prefetch system of claim 1, wherein the prefetcher component is further configured for tagging the first portion of data with a first tag that indicates the first probability of the first future use of the first portion of data by the processor and the second portion of data with a second tag that indicates a second probability of a second future use of the second portion of data by the processor.

7. The cache prefetch system of claim 1, wherein the prefetcher component is further configured for prefetching the set of data from the main memory via the interconnect for storage in the lower-level cache, in response to not identifying, in the lower-level cache, a memory location associated with at least a portion of the set of data.

8. The cache prefetch system of claim 1, wherein the prefetcher component is further configured for prefetching the first portion of data from the higher-level cache in response to the processor requesting the first portion of data.

9. The cache prefetch system of claim 1, wherein the higher-level cache is shared by a plurality of processors comprising the processor.

10. A cache system comprising:
a processor;
a data-holding component, the data-holding component comprising one of (a) a register or (b) a first cache;
a second cache;
a system memory;
an interconnect configured for communicably coupling the processor, the data-holding component, the second cache, and the system memory, wherein a first latency for transferring data from the data-holding component to the processor is smaller than a second latency for transferring data from the second cache to the processor; and
wherein the cache system is configured to facilitate performance of operations, comprising:
retrieve a set of data from a system memory for storage in the data-holding component;
tagging a first portion of data associated with the set of data with a first indication that the first portion of data is executed data that was executed by the processor and is to be sent from the data-holding component to the system memory;
tagging a second portion of data of the set of data with a second indication based on determining at least one of (a) that the second portion of data exceeds the storage capacity of the first cache or (b) that the second portion of data has been unused, and that the second portion is predicted to be possibly executed by the processor within a defined period of time; and
evicting the second portion of data from the processor cache to the second cache based on the tagging of the second portion of data.

11. The cache system of claim 10, wherein the operations further comprise:
evicting the first portion of data from the data-holding component to the system memory based on the first indication.

12. The cache system of claim 10, wherein the operations further comprise:
retrieving the evicted second portion of data from the second cache to the data-holding component in response to receiving, from the processor, a request to execute the second portion of data.

13. The cache system of claim 10, wherein the processor, the system memory, and the second cache are communicably coupled via a ring interconnect.

14. The cache system of claim 10, wherein the first latency and the second latency are smaller than a third latency for transferring data from the system memory to the processor.

15. The cache system of claim 10, wherein the first portion of data is requested in a data request and the second portion of data is not requested in the data request, wherein the first portion of data and the second portion of data are determined to be related to each other based on a logical proximity and a physical proximity of the first portion of data and the second portion of data to each other in the system memory, and wherein the first portion of data and the second portion of data are prefetched from the system memory for storage in the data-holding component in response to the data request based on the first portion of data and the second portion of data being determined to be related to each other.

16. A caching method, comprising:
retrieving a set of data from a system memory for storage in a low-level cache, the low-level cache associated with at least a processor of a plurality of processors, wherein the set of data is related to a set of data currently requested for execution by the processor;
tagging a portion of data of the set of data with an indicator that indicates the portion of data (i) has not been used by the processor, (ii) is too large for the low-level cache, (iii) is to be evicted from the low-level cache to a high-level cache, and (iv) is predicted to be used by the processor within a defined period of time,
wherein the portion of data is determined to have a defined probability of being used by the processor within a predetermined period of time, and
wherein the high-level cache is shared by the processor and at least one other processor of the plurality of processors; and
tagging a second portion of data associated with the set of data with a second indicator that indicates the second portion of data his used data that was used by the processor, and (ii) is to be transferred from the low-level cache to the system memory.

17. The caching method of claim 16, further comprising:
evicting the second portion of data from the processor cache to the system memory based on the tagging of the second portion of data with the second indicator.

18. The caching method of claim 16, further comprising:
evicting the portion of data from the low-level cache to a high-level cache based on the tagging of the portion of data with the indicator.

19. The caching method of claim 18, further comprising:
retrieving the evicted portion of data from the high-level cache to the low-level cache in response to receiving a request to execute the portion of data from the processor.

20. The caching method of claim 16, further comprising:
setting a first indicator bit to a first value to facilitate the tagging of the portion of data with the indicator.

* * * * *

UNITED STATES PATENT AND TRADEMARK OFFICE
CERTIFICATE OF CORRECTION

PATENT NO. : 10,613,984 B2
APPLICATION NO. : 15/957130
DATED : April 7, 2020
INVENTOR(S) : Svendsen Page 1 of 1

It is certified that error appears in the above-identified patent and that said Letters Patent is hereby corrected as shown below:

On the Title Page

Item (63), Related U.S. Application Data, "Continuation of application No. 14/710,837, filed on May 31, 2015" should read --Continuation of application No. 14/710,837, filed on May 13, 2015--.

Signed and Sealed this
Third Day of November, 2020

Andrei Iancu
*Director of the United States Patent and Trademark Office*